United States Patent
Kizu et al.

[11] 3,888,508
[45] June 10, 1975

[54] SAFETY APPARATUS FOR STEERING WHEEL ASSEMBLY

[75] Inventors: Ryohei Kizu; Tadao Muramatu, both of Toyota; Teruo Kobayasi, Harutti-Mura, all of Japan

[73] Assignee: Toyota Jidosha Kogyo Kabushiki Kaisha, Toyota, Japan

[22] Filed: Apr. 13, 1973

[21] Appl. No.: 350,784

[30] Foreign Application Priority Data
Apr. 19, 1972 Japan................ 47-39375

[52] U.S. Cl. ......... 280/150 AB; 74/492; 280/87 R; 280/150 B
[51] Int. Cl. ........................................ B60r 21/08
[58] Field of Search........ 280/150 AB, 150 B, 87 R; 74/492; 224/29 E

[56] References Cited
UNITED STATES PATENTS

| 3,167,974 | 2/1965 | Wilfert | 280/87 R |
|---|---|---|---|
| 3,435,701 | 4/1969 | Bucher | 280/150 B |
| 3,622,176 | 11/1971 | Byer | 280/150 AB |
| 3,624,810 | 11/1971 | Hass | 280/87 R |
| 3,632,136 | 1/1972 | Foltz | 280/150 AB |
| 3,747,953 | 7/1973 | Goes | 280/150 AB |
| 3,764,160 | 10/1973 | Fiala | 280/150 AB |
| 3,768,824 | 10/1973 | Kloppe | 280/87 R |
| 3,774,932 | 11/1973 | Schiesterl | 280/87 R |
| 3,787,074 | 1/1974 | Lewis | 280/150 AB |
| 3,819,205 | 6/1974 | Dunford et al. | 280/150 AB |
| 3,822,894 | 7/1974 | Muller et al. | 280/150 AB |

FOREIGN PATENTS OR APPLICATIONS

| 609,624 | 9/1960 | Italy | 280/150 AB |
|---|---|---|---|
| 896,312 | 10/1953 | Germany | 280/150 AB |
| 1,948,615 | 4/1971 | Germany | 280/150 AB |

Primary Examiner—David Schonberg
Assistant Examiner—John P. Silverstrim
Attorney, Agent, or Firm—Stevens, Davis, Miller & Mosher

[57] ABSTRACT

An inflatable impact energy absorbing bag type safety apparatus for a steering wheel assembly of a vehicle comprising a pad member to cover and to be mounted on spokes of the steering wheel assembly, a bag container installed within the pad member, an inflatable bag confined air-tightly within the container and a cover member removably mounted on the container to close the opening of the container, the inflatable bag being inflated by pressurized fluid supplied from an external pressure source through the bottom of the container in an occurrence of vehicle collision.

7 Claims, 10 Drawing Figures

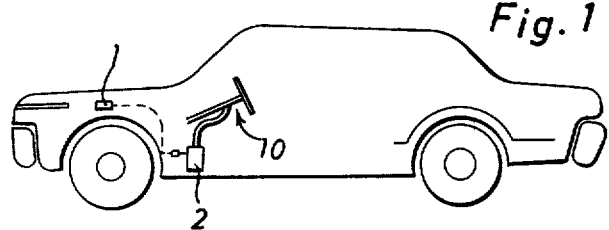
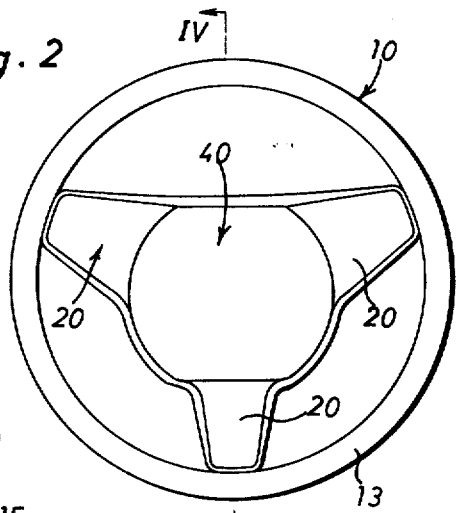
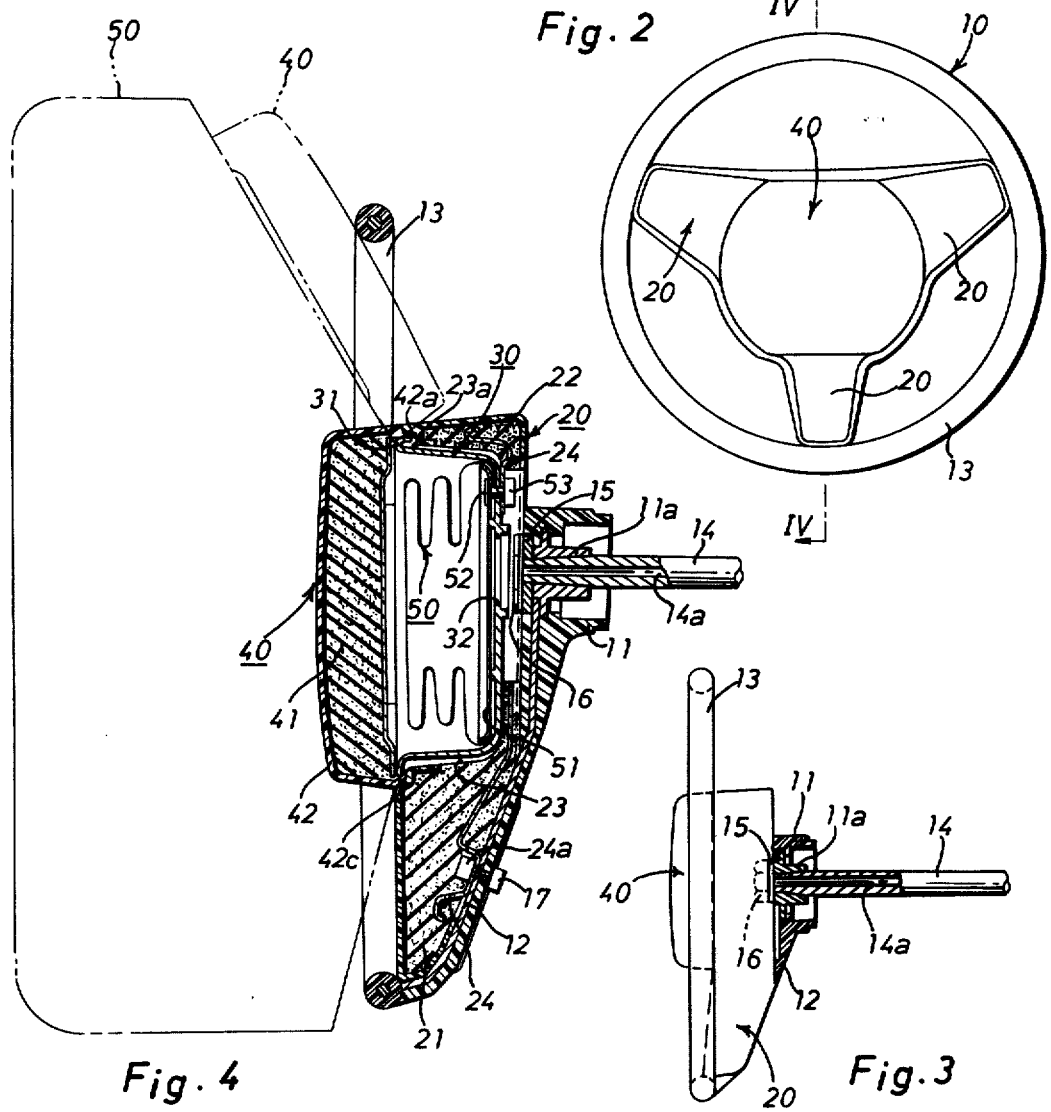

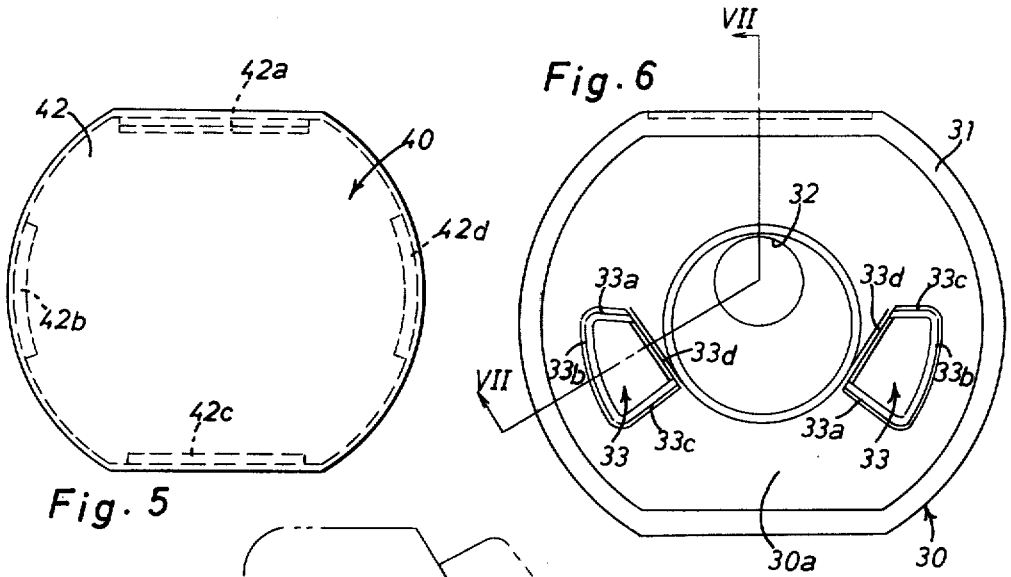
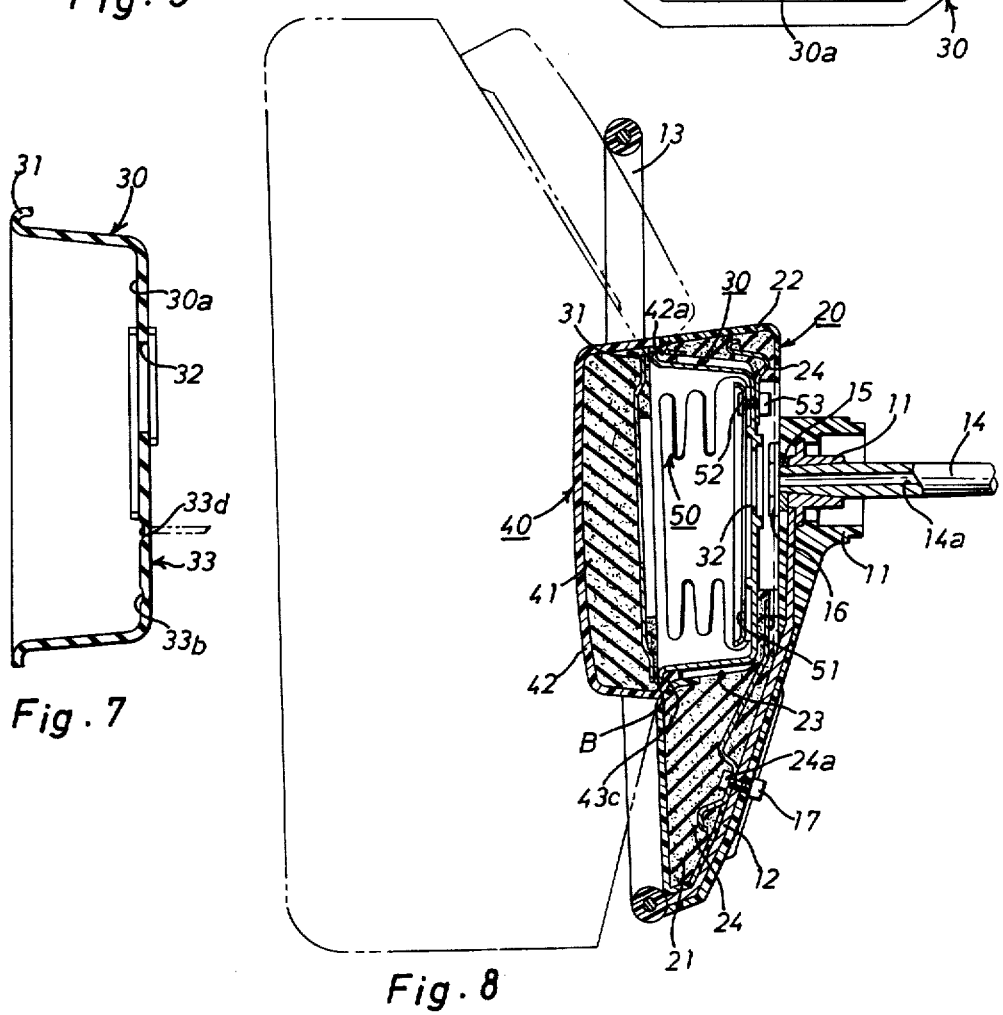

3,888,508

SAFETY APPARATUS FOR STEERING WHEEL ASSEMBLY

BACKGROUND OF THE INVENTION

The present invention relates to a safety apparatus for a steering wheel assembly of a vehicle, and more particularly to an inflatable impact energy absorbing bag type safety apparatus which is simply constructed and easily assembled with the steering wheel assembly.

SUMMARY OF THE INVENTION

A primary object of the present invention is to provide an inflatable impact energy absorbing bag containing apparatus which can easily be mounted on a steering wheel assembly by provision of a pad member mountable on the spokes of the steering wheel thereby increasing production efficiency and safety effects.

Another object of the present invention is to provide an inflatable impact energy absorbing bag containing apparatus, having the above-mentioned features, wherein a cover member to close the opening of an inflatable bag container contained in the pad member can be hinged and not be blown away in inflation of the bag thereby the bag and the operater are kept safe from any possible damages by the cover member.

A further object of the present invention is to provide an inflatable impact energy absorbing bag containing apparatus, having the above-mentioned features, wherein the secondary impact energy can be absorbed by provision of drain valve means to let exceeding pressure escape out of the inflated bag, the valve means being designed to be integral with the container and to be activated by the exceeding inner pressure of the inflated bag thereby eliminating provision of special or exclusive component parts for the valve.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a schematic view of an arrangement of the present invention with accompanying accessory devices;

FIG. 2 is a front view of an embodiment of a safety apparatus in accordance with the present invention;

FIG. 3 is a partially broken elevational view of the apparatus in FIG. 2;

FIG. 4 depicts an enlarged sectional view taken along the IV — IV line in FIG. 2;

FIG. 5 is a plan view of a cover member adapted in the apparatus in FIG. 4;

FIG. 6 is a plan view of a bag container adapted in the apparatus disclosed in FIG. 4;

FIG. 7 is a sectional view taken along the VII — VII line in FIG. 6;

FIG. 8 is an enlarged sectional view corresponding to FIG. 4 but with a modified cover member;

DESCRIPTION OF THE PREFERRED EMBODIMENTS

Figure 9:
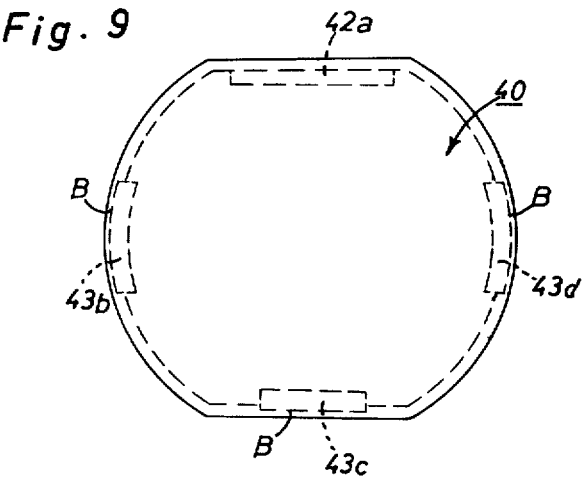
FIG. 9 is a plan view of the cover member disclosed in FIG. 8.

Now referring to the drawings, particularly in FIG. 1 there is shown a general arrangement of the present invention with accompanying accessory devices. A steering wheel assembly 10 is mounted on a steering column assembly which is connected to a pneumatic pressure source 2 by way of a conduit. The pressure source 2 may be such a conventional type as a gas cylinder which includes a valve releasing device. A conventional collision sensing device 1 is mounted on a portion of the vehicle body and operatively connected to the valve releasing device; the collision sensing device 1 may be a body-deformation sensor or a radar sensor. The valve releasing device functions to let pressurized operation fluid jet out from the pressure source 2 in response to a signal generated from the collision sensing device 1.

Reference is made to FIGS. 2 to 4, inclusive, wherein the steering wheel assembly 10 comprises substantially three identical spokes 12 radially projecting from a hub 11 and a steering wheel 13 integrated on the top ends of the spokes 12. A boss member 11a is firmly secured on the hub 11 and snugly coupled over the top end of a steering shaft 14. A lock nut 16 fastens the steering wheel assembly 10 through a washer 15 on the steering shaft 14. An axial passage 14a is drilled through the steering shaft 14 and connected to the pressure source 2.

A pad member 20 comprises a core cushion 21 made of polyurethane foam material with a predetermined thickness having an approximate T-shape and a synthetic resin cover 22 for integrally covering the core cushion 21. The pad member 20 is provided at its central portion with a chamber 23 for receiving therein a bag container 30 in which an inflatable impact energy absorbing bag 50 is confined in an unoperating or collapsed condition.

The bag container 30 is, as well shown in FIGS. 6 and 7, one-piece moulded out of synthetic resin and formed in a bowl shape. The bag container 30 includes a flange 31 bending outwardly from the opening rim thereof and is provided at its bottom 30a with a circular inlet port 32 to lead the pressurized fluid from the pressure source 2 into the inflatable bag 50 through the axial passage 14a of the steering shaft 14 and with a pair of drain or relief valves 33 for controlling the pressure value inside the bag 50, when the bag 50 is inflated, within a predetermined one.

The relief valves 33 are formed integrally with the bag container 30 and positioned symmetrically below the inlet port 32 in FIG. 6. Each valve 33 comprises portions 33a, 33b and 33c which are moulded thinner than other substantial portion of the bag container 30. The valve 33 also includes a hinge portion 33d, thus, after the inside pressure of the inflated bag 50 reaches the predetermined value, the thin portions 33a, 33b and 33c will be broken and the valve 33 opens by way of the hinge portion 33d to let the exceeding pressure escape therefrom.

As well illustrated in FIG. 4, the opening rim of the collapsed bag 50 is air-tightly secured on the circular edge of the bottom 30a of the bag container 30 by way of an annular retainer 51. The container 30 is placed in the chamber 23 of the pad member 20 and clamped on a sheet metal 24 inlaid within the core cushion 21 by way of a bolt 52 integrally secured on the retainer 51 and a nut 53.

Referring to FIGS. 4 and 5, a cover member 40 for the container 30 comprises a circular core cushion 41 made of polyurethane foam material having a predetermined thickness and a synthetic resin cover 42 which overlies integrally the core cushion 41. As particularly clear in FIG. 5, provided integrally with the cover 42 is a hinge member 42a on the upper outer rim (in the figure) of the cover member 42, the hinge member 42a having an approximate U-shape cross-section and being unremovably clamped in a slit formed between the upper portion of the flange 31 of the container 30 and an annular recess 23a provided along the upper rim of the chamber 23 of the pad member 20. The cover member 40 is also provided with flanges 42b, 42d and 42c with L-shape cross-sections respectively at the left, right and lower outer rims thereof (in the figure). The flanges 42b, 42d and 42c are integral with the cover 42 and removably mounted in slits formed between the flange 31 of the container 30 and the annular recess 23a of the pad member 20 respectively at the left, right and lower portions of the flange 31. Thus, when the cover member 40 is assembled on the container 30 in the mentioned way, the cover member 40 remains assembled in regular steering operation. And in an occurrence of vehicle collision, the flanges 42b, 42c and 42d is blown away from their places by the inner pressure of the inflated bag 50 and the cover member 40 is freely hinged by the hinge 42a.

Disclosed in reference to FIGS. 8 and 9 is a modification to assemble the cover member 40 on the container 30. Provided are flanges 43b, 43c and 43d which correspond respectively to the flanges 42b, 42c and 42d of the previously mentioned embodiment. The base portions B of the flanges 43b, 43c and 43d are formed thinner than other portions so that they are breakable by the inner pressure of the inflated bag 50 and hinged freely by the hinge 42a in an occurrence of vehicle collision.

An assembling for the impact energy absorbing bag containing apparatus may be proceeded by installing the bag container 30, the inflatable bag 50 and the cover member 40 in the chamber 23 of the pad member 20. The assembled apparatus will further be assembled with the steering wheel assembly 10 by threading bolts 17 through the spokes 12 into corresponding nuts 24a welded on the inner face of the sheet metal 24 inlaid within the core cushion 20. (see FIG. 4)

In the above-disclosed embodiment of the present invention, a vehicle collision, which may unfortunately take place, activates the collision sensor 1 which in turn operates the valve releasing device. Thus, operation fluid or pneumatic pressure is issued from the pressure source 2 and jets into the inflatable bag 50 through the passage 14a of the steering shaft 14 and the inlet port 32 of the bag container 30.

Figure 10:
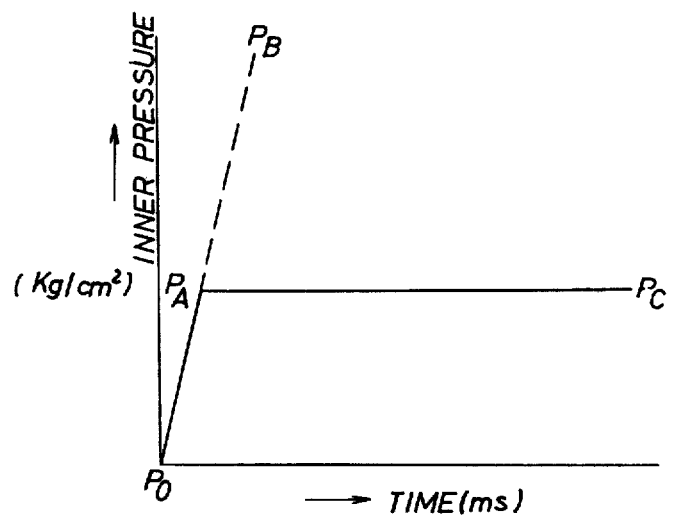
FIG. 10 shows a characteristic line for the pressure value changes within an inflatable bag of the apparatus.

As well shown in FIG. 10, the inner pressure of the inflated bag 50 increases along a line represented by $P_0$ – $P_R$. In this instance, the inner pressure of the bag 50 pushes the flanges 42b, 42c and 42d out of their normal positions in the first embodiment or breaks the base portions B of the flanges 43b, 43c and 43d in the modification. So that in either cases the cover member 40 is freely hinged by the hinge 42a and the bag 50 is inflated in a preliminarily designed shape as shown by an imaginary line in FIG. 4. When the inner pressure of the bag 50 reaches up to a predetermined value represented by $P_A$, the thin portions 33a, 33b and 33c of the drain valves 33 provided on the bottom 30a of the bag container 30 are broken to open the valves 33 which is now hinged at the hinge portions 33d. Consequentially, the inner pressure of the inflated bag 50 is maintained at the value represented by $P_A$ – $P_I$.

With the disclosed embodiments, it is necessary to open the valves 33 after the cover member 40 is freely hinged. This makes it indispensable that the relative relation between the assembling load of the cover member 40 toward the bag container 30 and the breaking load to free or operate the valves 33 should be realized on a basis of the most proper inner pressure of the bag 50.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A safety apparatus for a steering wheel assembly of a vehicle having a collision sensor and a fluid pressure source for activating said safety apparatus in response to a signal generated from said sensor, comprising:
   a pad member including a core cushion on spokes of said steering wheel assembly, said pad member including means defining a chamber in substantially the central portion thereof,
   a bag container made of synthetic resin in the shape corresponding to said chamber, said bag container being within said chamber and having, on its bottom portion, an inlet port connected to said pressure source through the steering column assembly for said steering wheel assembly,
   an inflatable bag confined air-tightly within said bag container; said inflatable bag being inflated by pressurized fluid from said pressure source through said inlet port in case of vehicle collision,
   said bag container further having drain valve means formed by at least one breakable portion normally integral with said bottom portion of said bag container whereby when the pressure in the bag upon inflation reaches a predetermined inner pressure a portion of the breakable portion breaks to let any exceeding pressure, above the predetermined pressure, escape out of the inflated bag, and
   a cover member having a core cushion formed in the shape corresponding to the opening of said bag container and a cover which overlies integrally said cover member core cushion; said cover member being mounted on said bag container to move from a position closing the opening thereof to a position lateral of said bag container opening in response to inflation of said bag.

2. A safety apparatus for a steering wheel assembly as claimed in claim 1, wherein said bag container is secured at its bottom portion on a sheet metal integrally inlaid within said core cushion of said pad member.

3. A safety apparatus for a steering wheel assembly as claimed in claim 1, wherein said breakable portion of said bag container includes a hinge portion moulded thinner than said bottom portion and other portions moulded thinner than said hinge portion; said hinge portion holding said breakable portion hinged thereon when said other portions are broken by any exceeding pressure above the predetermined inner pressure, exerted within said inflated bag.

4. A safety apparatus for a steering wheel assembly as claimed in claim 1, wherein said bag container has at its outer rim, a flange outwardly bent for removably mounting said cover member between said flange and said pad member.

5. A safety apparatus for a steering wheel assembly as claimed in claim 4, wherein said cover member has a portion unremovably hinged and other portions removably mounted between said flange and said pad member whereby said cover member is held at said hinged portion when said removable portions are blown out from the mounting places thereof by inflation of said bag.

6. A safety apparatus for a steering wheel assembly as claimed in claim 4, wherein said cover member has a portion unremovably hinged and breakable portions mounted between said flange and said pad member whereby said cover member is held at said hinged portion when said breakable portions are broken off from the mounting places thereof by said bag being inflated.

7. A safety apparatus for a steering wheel assembly as claimed in claim 1, wherein said core cushion of said pad member includes therein a sheet metal which extends correspondingly along the shape of said spokes and said pad member is mounted on said spokes by way of said sheet metal.

* * * * *